US007966780B2

(12) United States Patent
Marshall et al.

(10) Patent No.: US 7,966,780 B2
(45) Date of Patent: Jun. 28, 2011

(54) THERMALLY CONDUCTIVE WALL STRUCTURE

(75) Inventors: Dale Marshall, Calgary (CA); Carlo Galasso, Calgary (CA)

(73) Assignee: Encon Environmental Construction Solutions Inc., Calgary, Alberta (CA)

( * ) Notice: Subject to any disclaimer, the term of this patent is extended or adjusted under 35 U.S.C. 154(b) by 168 days.

(21) Appl. No.: 12/474,871

(22) Filed: May 29, 2009

(65) Prior Publication Data

US 2010/0300018 A1 Dec. 2, 2010

(51) Int. Cl.
*E04B 2/00* (2006.01)
*E04B 1/62* (2006.01)
*F24J 3/08* (2006.01)

(52) U.S. Cl. ........ 52/169.11; 52/293.1; 52/294; 52/295; 52/741.13; 52/745.09; 62/260; 165/45; 165/185

(58) Field of Classification Search ............... 52/169.11, 52/293.1, 293.3, 294, 295, 741.13, 745.09; 165/45
See application file for complete search history.

(56) References Cited

U.S. PATENT DOCUMENTS

| | | | | | |
|---|---|---|---|---|---|
| 2,815,656 | A | * | 12/1957 | Klein et al. | 52/169.1 |
| 3,195,619 | A | * | 7/1965 | Tippmann | 165/45 |
| 4,627,205 | A | * | 12/1986 | Hitchins | 52/294 |
| 4,694,625 | A | * | 9/1987 | Gregory | 52/294 |
| 4,930,572 | A | * | 6/1990 | Doshier | 165/45 |
| 6,120,723 | A | * | 9/2000 | Butler | 264/333 |
| 6,125,597 | A | * | 10/2000 | Hoffman et al. | 52/169.12 |
| 6,632,048 | B2 | * | 10/2003 | Greenberg | 405/284 |
| 6,679,649 | B1 | * | 1/2004 | Capolupo | 404/6 |
| 6,718,722 | B2 | * | 4/2004 | Worrell et al. | 52/741.13 |
| 7,707,797 | B2 | * | 5/2010 | Henderson | 52/745.17 |
| 2005/0210785 | A1 | * | 9/2005 | Way | 52/295 |
| 2007/0151704 | A1 | * | 7/2007 | Elmore | 165/45 |
| 2009/0293393 | A1 | * | 12/2009 | Masters et al. | 52/295 |
| 2010/0200192 | A1 | * | 8/2010 | Consigny | 165/45 |

FOREIGN PATENT DOCUMENTS

| | | | |
|---|---|---|---|
| EP | 0 189 733 A1 | * | 8/1986 |
| GB | 2 249 623 A | * | 5/1992 |
| JP | 56-59926 | * | 5/1981 |
| WO | 80/02736 | * | 12/1980 |

\* cited by examiner

*Primary Examiner* — Robert J Canfield
(74) *Attorney, Agent, or Firm* — Notaro, Michalos & Zaccaria P.C.

(57) ABSTRACT

There is described a wall structure for absorbing or transferring heat from or to the ground, the wall structure comprising a footing for the wall structure disposed in the ground below grade extending in the longitudinal direction of the wall structure, a vertical wall supported on and extending longitudinally in the direction of the footing, the vertical wall extending upwardly from the footing above grade to a predetermined height, and having upper, lower, interior, exterior and end surfaces, a sheath of insulation for enveloping the vertical wall's upper, end, interior and exterior surfaces and thermal conductors disposed in the wall structure to be in thermal communication with one another, at least some of the conductors extending outwardly from the footing into the ground, the thermal conductors facilitating heat transfer between the ground and the vertical wall.

34 Claims, 5 Drawing Sheets

THERMALLY CONDUCTIVE WALL STRUCTURE

FIELD OF THE INVENTION

The present invention relates to wall structures and more particularly to wall structures adapted to absorb energy from the ground and transfer the energy into a wall system.

BACKGROUND OF THE INVENTION

Heating and cooling buildings consumes a large amount of energy. This is particularly the case in climates where there is a great disparity between maximum summer and minimum winter temperatures, as in much of North America, where it is necessary that buildings are cooled in the summer and heated in the winter.

Buildings are cooled and heated by a variety of means, including air conditioning units, electric heaters, wood stoves, forced air gas furnaces, and hot water or steam radiators. It is generally the case that a constant indoor temperature is desired depending on the external temperature. For example, room temperature (a temperature at which humans are generally accustomed for indoor living) is typically between 64-74° F. (approximately 18-23.5° C.), however local climate conditions may acclimatise people to higher or lower temperatures.

To minimize heat transfer between a building and its surrounding environment, various construction techniques have been developed which minimize the amount of energy required to maintain constant indoor temperatures. Examples of such techniques include designing and using building materials and insulation with high values of thermal resistance (also known as R-values), and employing air-flow heat exchangers which minimize the amount of heat lost to the external environment in the winter and reduce the amount of heat gained from the external environment in the summer.

Another way to improve the energy efficiency of a building is to make use of available geo-thermal energy. As is well known, the ground temperature below the frost line in much of North America is a relatively stable 55-56° F. on average (approximately 13° C.) throughout much of North America, ranging from around 41° F. (5° C.) in northern climates to about 71° F. (21.6° C.) in southern climates.

Ground-source heat pumps are one well known type of technology which take advantage of this physical phenomenon. Heat pumps typically have a series of heat exchanging coils buried in the ground below the frost line. In warm summer months, water can be cooled to the ground temperature when circulating through these coils. This cooled water can then be circulated in radiators located inside the building to cool the interior space, among other applications. In a similar way, a building can be heated in the winter by warming the water in the heat exchanging coils. The disadvantage of this technology is that energy must be added into the system (usually in the form of electrical energy to run a compressor) as a heat pump utilizes the same operating principles and cycles as a refrigerator.

However, there has been a lack of construction technology specifically designed to take advantage of the fact that the ground surrounding and underlying a building can be used as a heat sink in the summer and a heat source in the winter.

Therefore, there is a need for building structures and techniques which reduce energy consumption by using the ground as a source of heat in the winter and as a heat sink in the summer.

BRIEF DESCRIPTION OF THE INVENTION

The present invention provides a wall structure which is designed to take advantage of the ground's latent heat in both the winter and summer. The thermally conductive wall structure of the present invention is comprised of a concrete footing which is buried below the frost level, preferably by at least three feet. This concrete footing acts as a thermal interface, as it is designed to thermally communicate with the ground.

A thermally conductive strip runs the length of the concrete footing, preferably positioned slightly off-center toward the interior of the building. A vertical wall extends upwards from the footing and horizontally along the footing and is typically centred on the footing. The thermally conductive strip is therefore sandwiched between the vertical wall and the concrete footing, preferably at a position adjacent to the interior surface of the vertical wall. The vertical wall is typically formed of concrete.

A internal grid is formed within the vertical wall and extends through the thermally conductive strip and the concrete footing. In a preferred embodiment the grid extends directly into the ground, however it is also contemplated that the grid terminates at the thermally conductive strip and is connected in a thermally communicative manner to a further set of posts sunk directly into the ground, among other arrangements. Preferably, the internal grid is comprised of vertical bars which extend through the interior of the vertical wall, the thermally conductive strip and the concrete footing and into the ground. Horizontal bars extend horizontally through the interior of the vertical wall, which are connected to the vertical bars by way of thermally conductive links.

The vertical wall is then insulated by an insulating sheath which envelops the vertical wall on all surfaces other than the bottom surface that abuts the concrete footing.

The thermally conductive wall structure of the present invention reduces the energy necessary for heating and cooling a building by maintaining an internal wall temperature that is near the temperature of the ground at a point below the frost line (i.e: at the concrete footing). This reduces the difference in temperature between the interior of the thermally conducting wall structure and the desired indoor temperature in all seasons. As a lower difference in these two temperatures must be overcome by the building's heating or cooling systems, less energy is required to maintain stable and comfortable indoor temperatures.

In accordance with the present invention then, there is provided a thermally conductive wall structure comprising a longitudinally extending ground engaging footing, said footing extending horizontally through the ground below the frost level and having an upper surface and a lower surface; a vertical wall, said wall extending vertically above grade from said footing and longitudinally along said footing, said wall having a lower surface, an upper surface, an interior surface and an exterior surface, said lower surface abutting said footing; a thermally conductive strip, said strip longitudinally positioned on the upper surface of said footing, said strip being located between the upper surface of said footing and the lower surface of said vertical wall; an insulating sheath, said sheath enveloping the interior, exterior and upper surfaces of said vertical wall; a first plurality of thermally conductive members disposed inside said vertical wall to be in thermal communication with one another, at least some of said members being in contact with said thermally conductive strip for heat transfer therebetween; and a second plurality of thermally conductive members disposed in said footing to be in thermal communication with said thermally conductive strip for heat transfer therebetween, at least some of said second plurality of thermally conductive members extending downwardly through the lower surface of said footing into the ground a selected distance.

According to a further aspect of the present invention, there is provided a wall structure for absorbing or transferring heat from or to the ground, the wall structure comprising a footing for the wall structure disposed in the ground below grade extending in a longitudinal direction of the wall structure; a vertical wall supported on and extending longitudinally in the direction of the footing, the vertical wall extending upwardly from the footing above grade to a predetermined height, and having upper, lower, interior, exterior and end surfaces; a sheath of insulation for enveloping said vertical wall's upper, end, interior and exterior surfaces; and thermal conductors disposed in said wall structure to be in thermal communication with one another, at least some of said conductors extending outwardly from said footing into the ground, the thermal conductors facilitating heat transfer between the ground and the vertical wall.

According to yet another aspect of the present invention, there is provided a method of effecting heat transfer between a wall structure and the ground, comprising the steps of forming a longitudinally extending footing in the ground below the frost level; supporting a vertical wall on the footing, the vertical wall extending upwardly from the footing to a selected height above grade; sheathing the vertical wall in insulation; and lacing the interior of the vertical wall and the footing with thermally communicating heat conducting members, at least some of the heat conducting members extending outwardly from the footing into the ground a selected distance to facilitate heat transfer between the ground and the vertical wall.

BRIEF DESCRIPTION OF THE DRAWINGS

Preferred embodiments of the present invention will now be described in greater detail and will be better understood when read in conjunction with the following drawings in which.

DETAILED DESCRIPTION OF THE PREFERRED EMBODIMENTS

As is well known, the temperature inside the ground below the frost line is a relatively stable 55-56° F. on average (approximately 13° C.) throughout much of North America, ranging from around 41° F. (5° C.) in northern climates to about 71° F. (21.6° C.) in southern climates. This temperature is above the normal ambient atmospheric temperature during northern winters and below normal ambient atmospheric temperatures during the summer in most places. This delta temperature has therefore been previously used to effect a heat transfer that warms in the winter and cools in the summer. The heat transfer however has typically been accomplished using conventional heat exchangers that transfer heat from one fluid to another by means of direct thermal coupling or airflow.

The present invention seeks to use the ground's latent heat to heat, or cool, a concrete wall structure through direct thermal conduction.

Figure 1:
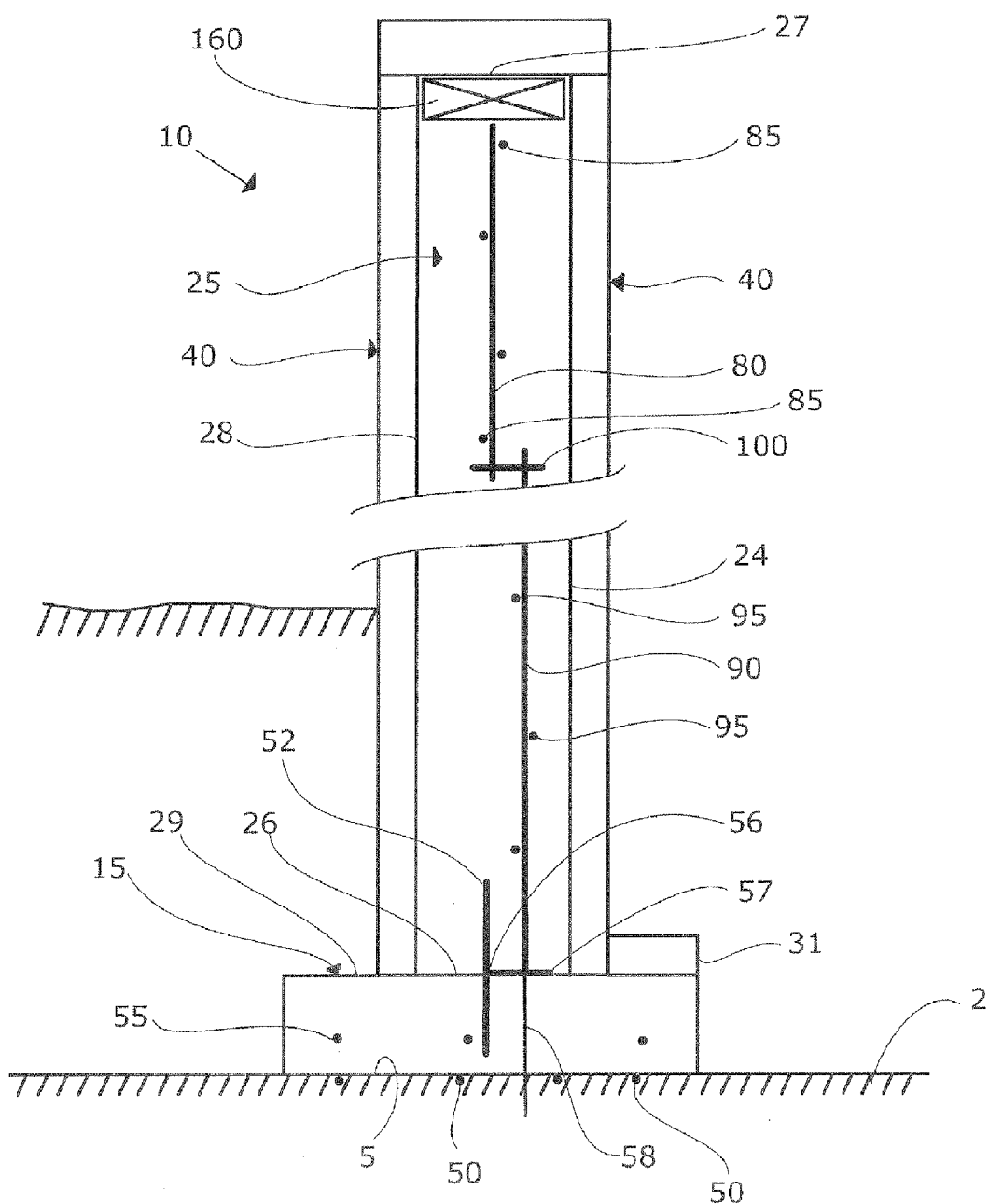
FIG. 1 is a side elevational transversely cross-sectional view of the conductive wall structure of the present invention.

With reference to FIG. 1, wall structure 10 generally comprises a ground engaging concrete footing 15, a vertical wall 25 and an envelope of insulation 40 that completely sheaths wall 25 except for the wall's lowermost surface 26 where it connects with footing 15. Any openings in the wall for windows, doors and the like will similarly and preferably be lined with insulation.

The ground 2 itself is the heat source for the present wall structure during the heating season so footing 15 is the primary thermal interface between the ground and wall 25 where the ground's energy is picked up.

Footing 15 will advantageously be positioned at least three feet below the local frost level, this level being the depth to which the ground will normally freeze in the coldest part of the winter, and is a poured concrete slab having a preselected transverse width of preferably at least 24 inches. Smaller widths are possible but testing shows that better results are obtained at 24 inches or greater. The footing's height will preferably be at least 8 inches but again this is variable. As will be appreciated, local building codes and engineering requirements will dictate the footing's minimum structural and dimensional requirements but the present invention may require that those minimums be exceeded.

The concrete for the footing will be gravel type having a minimum thermal conductivity of 2.0 W/mK. As will be known in the art, some concretes are not thermally conductive and the use of these is preferably avoided. Avoided concretes include lightweight, pumice powder, cellulose, isolation or slag concretes, all of which have significantly lower thermal conductivity. Applicant has found that the conductivity in the footing is increased using gravel having a 19 millimeter average particle size.

To increase heat transfer from the ground to the footing, the interface 5 between the two may optionally be laced with galvanized steel dowels 50. These can be laid in a cross-hatched pattern or linearly in the longitudinal direction of the footing on 16 inch centers, although other spacings are contemplated as well. Other patterns and configurations are possible, the idea simply being to facilitate heat transfer from the ground to the footing by means of these conductive elements. More effective means of promoting heat transfer from the ground to the footing are described below.

Within the footing itself, there will normally be reinforcing bar (rebar) in any event for strengthening the slab as necessary to meet local code and engineering requirements. Advantageously, the rebar will include a plurality of longitudinally extending continuous runs of steel 15M(#5) rebar 55. This rebar is normally located below the footing's horizontal center line as shown most clearly in FIG. 1. The typical placement of the rebar will be approximately 2 inches above the bottom of the footing. The rebar can be placed above or at the center line but for structural reasons, this is considered undesirable. Each run of rebar 55 will extend continuously and preferably without gaps or breaks from one end of the footing to the other and for a 24 inch wide footing, there will preferably be at least three of such runs.

A continuous and longitudinally extending strip 57 of heat conducting material is positioned on the footing's upper surface 29 in the position shown most clearly in FIG. 1 offset relative to vertical wall's 25 center line. As seen in FIG. 1, the strip is located on top of the footing adjacent the wall's interior surface 24. In one embodiment constructed by the applicant, strip 57 is a two inch wide 24 gauge piece of galvanized steel anchored in place by spaced apart galvanized steel dowels 58 that pass downwardly through the footing, through the soil-footing interface 5 and then into the soil itself to a predetermined depth, preferably a minimum of 4 inches.

The next element in the ground source pickup is a series of vertically oriented, longitudinally spaced apart dowels 52 that extend from a point in the footing close to but preferably not in contact with the ground/soil interface 5, vertically upwardly through the remainder of the footing and into the lower reaches of wall 25 as shown most clearly in FIG. 1. These dowels are preferably located along the wall's center line and contact the edge 56 of conductive strip 57 where the dowels emerge from the footing for thermally conductive contact with the strip. The dowels can be welded, wired to or simply biased against strip 57 for heat transfer therebetween. In one embodiment constructed by the applicant, dowels 52 are 10M(#4) steel rebar, are horizontally spaced apart at minimum 16 inch centers and each extends into wall section 25 by approximately 16 inches. This length of penetration can vary, but 16 inches has been found to provide good results.

Figure 2:
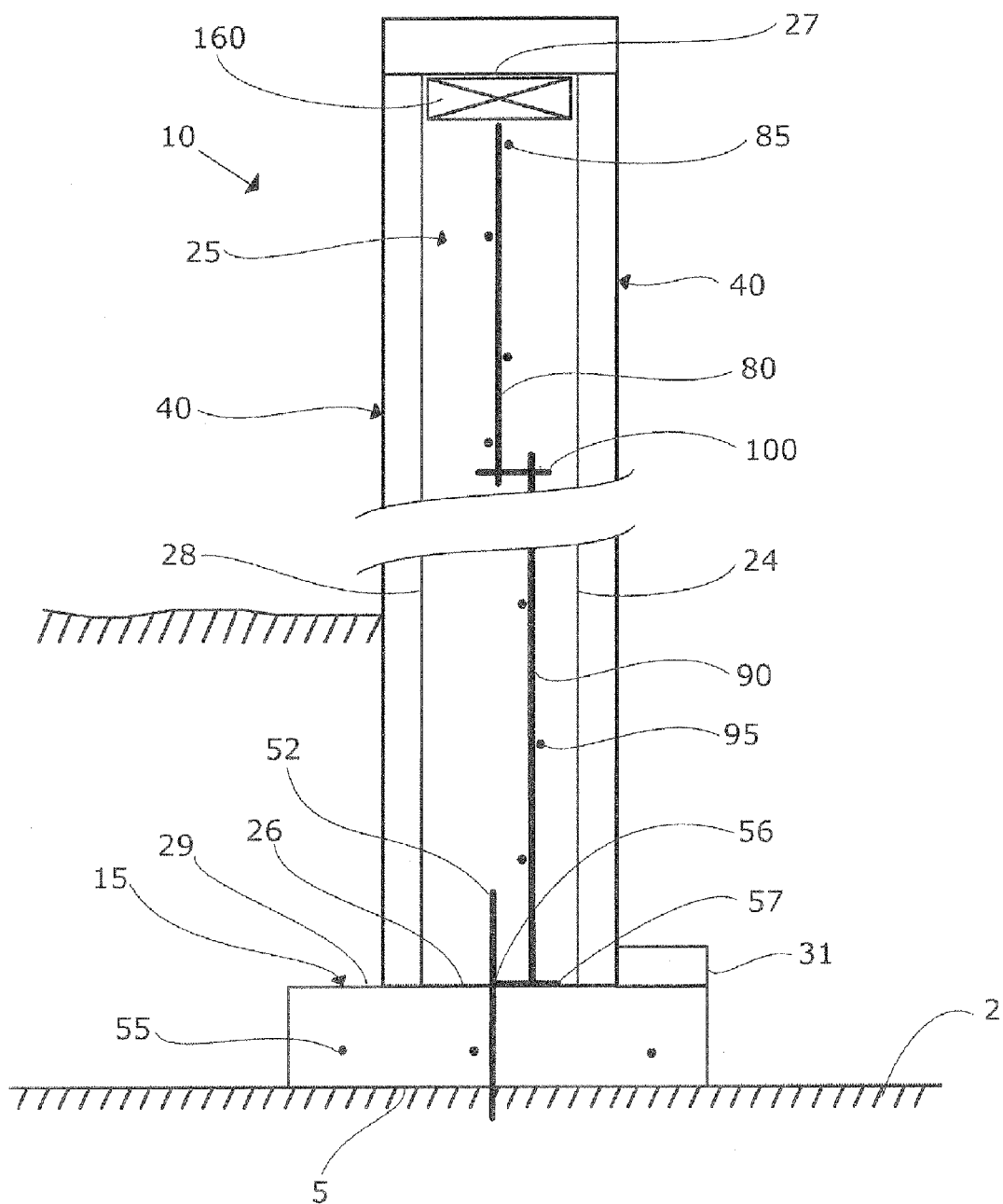
FIG. 2 is a side elevational transversely cross-sectional view of an alternative conductive wall structure.

In the alternative to using the two sets of dowels 52 and 58, dowels 58 can be eliminated if dowels 52 are downwardly elongated to penetrate through the footing and into the ground to a predetermined depth, preferably at least 4 inches as shown in FIG. 2. The dowels would then need to be corrosion protected, and the use of galvanized steel would be preferred in this application.

The next element of the wall system is to provide a conductive path for the heat absorbed from the ground into wall 25 itself.

With reference to FIG. 1 again, this can be accomplished in a number of ways with one particularly preferred configuration being shown in the drawing. This configuration is essentially a grid or grids of conductive elements located inside wall 25.

The conductive elements of the grid are center line vertical conductors 80, horizontal center line conductors 85, off center vertical conductors 90, off center horizontal conductors 95 and horizontal continuity links 100.

Figure 3:
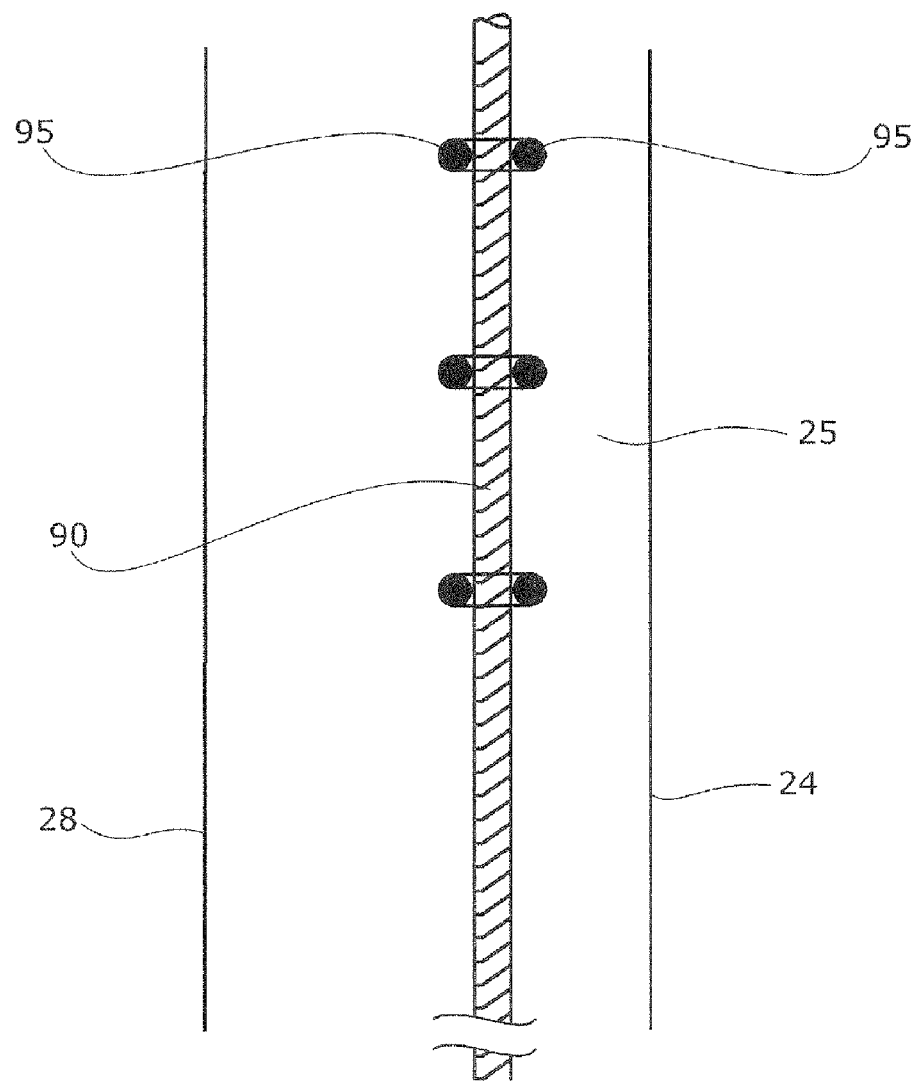
FIG. 3 is a side elevational view showing the above ground connection of conductive elements within the wall.

Starting from the bottom of wall 25, off center conductors 90 extend upwardly from strip 57 to a point in wall 25 a selected vertical distance above grade. The lower end of each conductor is biased, welded or otherwise connected to strip 57 so the two are thermally connected for heat transfer purposes. Conductors 90 are located off center of the wall more towards its interior surface 24 to better isolate the conductors from the wall's cold outer surface 28 and any moisture that might penetrate the wall from the ground. Off center horizontal conductors 95 are tied or otherwise connected to vertical conductors by means of metal wire, clips or other means known in the art, the only requirement being that all intersections between the conductors be thermally conductive. As seen in FIG. 1, conductors 95 can be located on alternating sides of vertical conductors 90 or the horizontal conductors can be located on both sides of the vertical conductors as shown in FIG. 3.

Above grade, vertical conductors 80 can be positioned along the wall's vertical center line with the horizontal conductors 85 connected thereto in the same manner described above with respect to conductors 90 and 95.

A thermally conductive continuity link 100 connects lower conductors 90/95 to upper conductors 80/85. The link can be made up of short sections of the same conductors used for conductors 80, 85, 90 and 95 that thermally connect the upper and lower conductor grids together for heat transfer therebetween.

The conductors in wall 25 can be lengths of 10M(#4) steel reinforcing bar connected together in a preferably minimum 16 inch on center grid in both the horizontal and vertical directions. As will be appreciated, the conductors can perform double duty as reinforcing for the wall itself in accordance with local building code requirements and engineering specifications.

As will be seen in FIG. 1, the conductive grids extend from the bottom of wall 25 to near its top where the wall includes a sill plate 160 which will normally be a piece of dimensional lumber for the connection of joists, rafters, trusses or other structural elements to the wall. To prevent heat loss, a thermal break (not shown) can be provided at the interface of sill plate 160 and the trusses etc. This can be achieved by using a rigid non-thermally conductive material such as polycarbonate insulation between the trusses etc. and the sill plate.

Unlike footing 15, wall 25 is preferably poured from low thermal conductivity concrete to minimize heat transfer from its warm side to its cold side. Again the concrete can be gravel concrete but using gravel having a 12 millimeter average diameter is preferred.

As mentioned above, the wall from footing 15 all the way to its top should be monolithically sheathed in insulation 40 so that there are no significant breaks, gaps or openings in the coverage. The insulation can be a foam type such as expanded polystyrene readily available from most building supply stores and which is manufactured in sheets. The foam insulation can be connected to the wall by means of adhesives, staples or any other means known in the art that are not thermally conductive. Whichever means are chosen should obviously minimize thermal conduction from the wall/insulation interface to the insulation's outer surface. For good results, the insulation on the wall's vertical surfaces should be minimum R9, and R25 along the wall's upper edge 27.

Any openings in wall 25 for doors, windows or other features should preferably be lined with slabs of foam or other equivalently insulative materials to prevent thermal loss around the opening edges. Equivalent materials can include for example the use of low expansion insulating foams injected into the peripheral gaps between the window/door and the wall openings to secure the windows/doors in place. The use of metal fasteners between the windows/doors and the concrete of wall 25 is preferably avoided to minimize thermal conduction.

Advantageously, the upper surface 29 of footing 15 on the side of interior wall surface 24 is also insulated for example by a piece of foam 31 (preferably minimum R8) to insulate the footing from the building's floor slab.

Wall 25 will itself extend from the building's footings 15 up to its eaves. It is preferable that wall 25 has minimal openings and penetrations as it is important to maintain as monolithic a construction as possible to maintain the integrity of the wall's thermal conductivity.

In operation, it has been found that a wall structure as described above conserves heat within the building and significantly reduces heat transfer from the inside to the outside in winter and from the outside to the inside in the cooling season. As will be appreciated, during the cooling season, the wall acts in reverse to its operation as described above in relation to the heating season and will conduct heat from above grade to the ground below grade.

Figure 4:
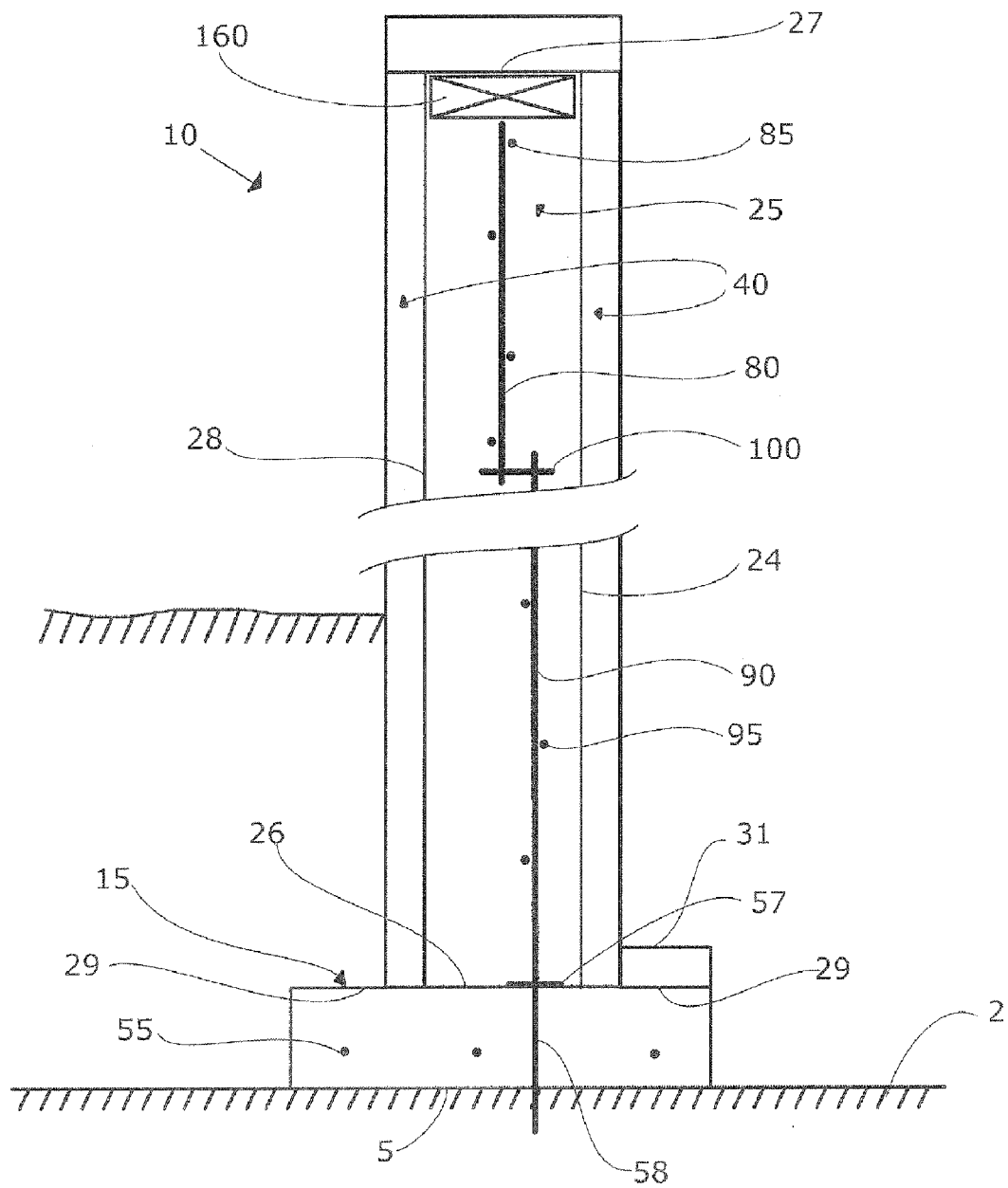
FIG. 4 is a side elevational transversely cross-sectional view of the conductive wall structure in accordance with another embodiment of the present invention.

With reference to FIG. 4, another embodiment of the present invention is illustrated wherein vertical conductor 90 is aligned with dowel 58. Therefore, dowel 58 is in thermal communication with conductive strip 57. Dowels 58 project through concrete footing 15 and through the soil-footing interface 5 into ground 2 as described above with reference to FIGS. 1 and 2. This construction eliminates the need for dowels 52.

Figure 5:
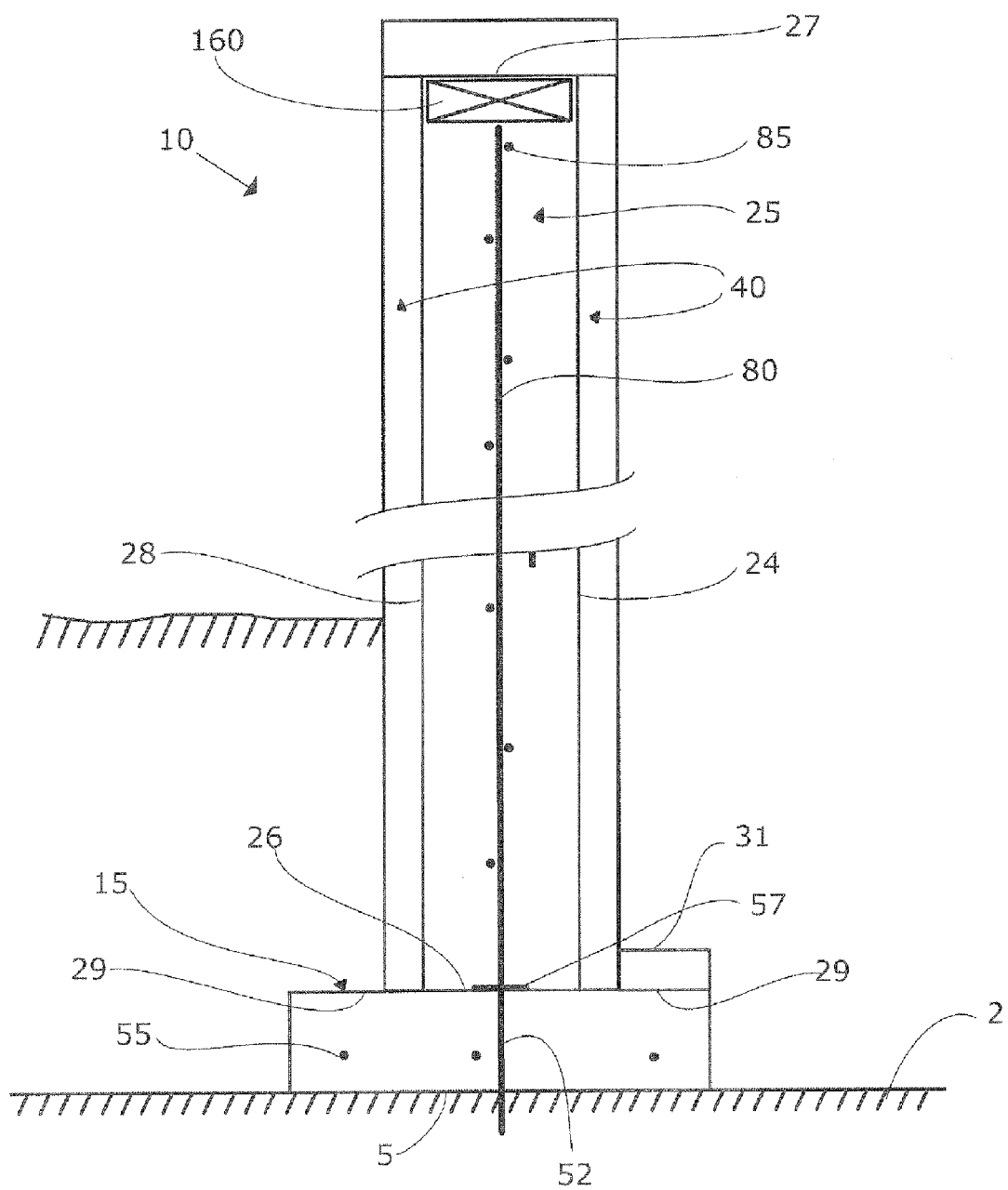
FIG. 5 is a side elevational transversely cross-sectional view of the conductive wall structure in accordance with yet another embodiment of the present invention.

With reference to FIG. 5, another embodiment of the present invention is illustrated wherein vertical conductors 80 extend vertically through wall 25, such that vertical conductors 90 are not required. Typically, each vertical conductor 80 will be located along the centre line of wall 25 towards inner wall surface 24 in the location of conductors 90 in FIGS. 1 and 4. In this embodiment, vertical conductor 80 is aligned with dowel 52. Therefore, dowel 52 is in thermal communication with conductive strip 57 and dowel 52 projects through concrete footing 15 and through the soil-footing interface 5 into ground 2 as described above in connection with FIGS. 1 and 2. This embodiment eliminates the need for two sets of dowels 52 and 58. Structurally however, this embodiment may not comply with local building codes that require below grade rebar to be located towards the wall's inner (tension) side due to the pressure of the earth on the wall's outer side. As well, in this embodiment, as in the others described above, the conductors in wall 25 can be thermally connected directly or indirectly to the dowels that extend into or through the footing which can eliminate the need for conductive strip 57 in some instances.

The above-described embodiments of the present invention are meant to be illustrative of preferred embodiments of the present invention and are not intended to limit the scope of the present invention. Various modifications, which would be readily apparent to one skilled in the art, are intended to be within the scope of the present invention. The only limitations to the scope of the present invention are set out in the following appended claims.

The embodiments of the invention in which an exclusive property or privilege is claimed are defined as follows:

1. A thermally conductive wall structure comprising:
   a longitudinally extending ground engaging footing, said footing extending horizontally through the ground below the frost level and having an upper surface and a lower surface;
   a vertical wall, said wall extending vertically above grade from said footing and longitudinally along said footing, said wall having a lower surface, an upper surface, an interior surface and an exterior surface, said lower surface abutting said footing;
   a thermally conductive strip, said strip longitudinally positioned on the upper surface of said footing, said strip being located between the upper surface of said footing and the lower surface of said vertical wall;
   an insulating sheath, said sheath enveloping the interior, exterior and upper surfaces of said vertical wall;
   a first plurality of thermally conductive members disposed inside said vertical wall to be in thermal communication with one another, at least some of said members being in contact with said thermally conductive strip for heat transfer therebetween; and
   a second plurality of thermally conductive members disposed in said footing to be in thermal communication with said thermally conductive strip for heat transfer therebetween, at least some of said second plurality of thermally conductive members extending downwardly through the lower surface of said footing into the ground a selected distance.

2. The thermally conductive wall structure of claim 1, wherein said first plurality of thermally conductive members form one or more grids in said vertical wall.

3. The wall structure of claim 2, wherein said one or more grids comprise vertically and horizontally arranged thermally conductive members, said vertically and horizontally arranged members being in thermal contact where they intersect for heat transfer therebetween.

4. The wall structure of claim 3, wherein said one or more grids comprise a first grid disposed in said vertical wall proximal the interior surface thereof, said first grid extending vertically from said thermally conductive strip to a point at grade or to a selected distance above grade.

5. The wall structure of claim 4, wherein said one or more grids comprise a second grid disposed in said wall structure approximately equidistant between said interior and exterior surfaces thereof, said second grid extending vertically from adjacent an upper edge of said first grid to a point just below said vertical wall's upper surface.

6. The wall structure of claim 5, wherein said first and second grids are thermally linked together for heat transfer therebetween.

7. The wall structure of claim 1, wherein said second plurality of thermally conductive members includes a set of dowels horizontally spaced apart in the longitudinal direction of said footing, each of said dowels extending vertically from a point a selected distance above said footing's lower surface to a point a selected distance into said vertical wall, each of said dowels contacting said thermally conductive strip for heat transfer therebetween.

8. The wall structure of claim 1, wherein said second plurality of thermally conductive members includes a set of dowels horizontally spaced apart in the longitudinal direction of said footing, each of said dowels extending vertically downwardly from contact with said thermally conductive strip, through said footing and into the ground by a selected distance.

9. The thermally conductive wall structure of claim 1, wherein said vertical wall is constructed from low thermal conductivity concrete.

10. The thermally conductive wall structure of claim 1, wherein a sill plate is mounted to the upper surface of said vertical wall, under said insulating sheath.

11. The thermally conductive wall structure of claim 1, wherein said footing is at least 24 inches wide.

12. The thermally conductive wall structure of claim 1, wherein said footing is constructed of thermally conductive concrete with a minimum thermal conductivity of 2.0 W/mK.

13. The thermally conductive wall structure of claim 1, wherein said footing additionally comprises at least one longitudinally aligned thermally conductive member extending continuously from one end of said footing to the other.

14. The thermally conductive wall structure of claim 1, wherein said insulating sheath is constructed of a material with an insulation value of at least R9 along the interior and exterior surfaces of said vertical wall and an insulation value of at least R25 along the upper surface of said vertical wall.

15. The thermally conductive wall structure of claim 1, wherein said footing is located at least three feet below said frost level.

16. The thermally conductive wall structure of claim 13, wherein said first and second plurality of thermally conductive members and said longitudinally aligned thermally conductive member are metallic rods.

17. The thermally conductive wall structure of claim 16, wherein said metallic rods reinforce said footing and said vertical wall.

18. A wall structure for absorbing or transferring heat from or to the ground, the wall structure comprising:

a footing for the wall structure disposed in the ground below grade extending in a longitudinal direction of the wall structure;

a vertical wall supported on and extending longitudinally in the direction of the footing, the vertical wall extending upwardly from the footing above grade to a predetermined height, and having upper, lower, interior, exterior and end surfaces;

a sheath of insulation enveloping said vertical wall's upper, end, interior and exterior surfaces; and thermal conductors disposed in said wall structure to be in thermal communication with one another, at least some of said conductors extending outwardly from said footing into the ground, the thermal conductors facilitating heat transfer between the ground and the vertical wall.

19. The wall structure of claim 18 wherein said thermal conductors include a first plurality of thermally conductive members disposed inside said vertical wall in thermal communication with one another.

20. The wall structure of claim 19 wherein said thermal conductors include a second plurality of thermally conductive members disposed in said footing, at least some of second plurality of thermally conductive members extending outwardly from said footing into the ground a selected distance, said first and second plurality of thermally conductive members being in thermal communication for heat transfer therebetween.

21. The wall structure of claim 20 wherein said thermal conductors include a thermally conductive strip disposed on said footing and extending longitudinally therealong, said thermally conductive strip being disposed between the footing and the vertical wall's lower surface.

22. The wall structure of claim 21 wherein at least some of said first and second plurality of thermally conductive members contact said thermally conductive strip for heat transfer therebetween and to thermally connect said first and second pluralities of thermally conductive members.

23. The wall structure of claim 22, wherein said first plurality of thermally conductive members form one or more grids in said vertical wall.

24. The wall structure of claim 23, wherein said one or more grids comprise vertically and horizontally arranged thermally conductive members, said vertically and horizontally arranged members being in thermal contact where they intersect for heat transfer therebetween.

25. The wall structure of claim 24, wherein said one or more grids comprise a first grid disposed in said vertical wall proximal the interior surface thereof, said first grid extending vertically from said thermally conductive strip to a point at grade or a selected distance above grade.

26. The wall structure of claim 25, wherein said one or more grids comprise a second grid disposed in said wall structure approximately equidistant between said interior and exterior surfaces thereof, said second grid extending vertically from adjacent an upper edge of said first grid to a point just below said vertical wall's upper surface.

27. The wall structure of claim 26, wherein said first and second grids are thermally linked together for heat transfer therebetween.

28. The wall structure of claim 27, wherein said second plurality of thermally conductive members includes a set of dowels horizontally spaced apart in the longitudinal direction of said footing, each of said dowels extending vertically from a point a selected distance above said footing's lower surface to a point a selected distance into said vertical wall, each of said dowels thermally contacting said thermally conductive strip for heat transfer therebetween.

29. The vertical wall structure of claim 28, wherein said second plurality of thermally conductive members includes a set of dowels horizontally spaced apart in the longitudinal direction of said footing, each of said dowels extending vertically downwardly from thermal contact with said thermally conductive strip, through said footing and into the ground a selected distance.

30. The wall structure of claim 18, wherein said vertical wall is constructed from low thermal conductivity concrete, and said footing is constructed from thermally conductive concrete with a minimum thermal conductivity of 2.0 W/mK.

31. The wall structure of claim 20, wherein a sill plate is mounted to the upper surface of said vertical wall, under said insulating sheath.

32. The wall structure of claim 18, wherein said footing additionally comprises at least one longitudinally aligned thermally conductive member extending continuously from one end of said footing to the other.

33. The wall structure of claim 32, wherein said first and second plurality of thermally conductive members and said longitudinally aligned thermally conductive member are metal rods.

34. A method of effecting heat transfer between a wall structure and the ground, comprising the steps of:

forming a longitudinally extending footing in the ground below the frost level;

supporting a vertical wall on the footing, the vertical wall extending upwardly from the footing to a selected height above grade;

sheathing the vertical wall's upper, end, interior and exterior surfaces in insulation; and lacing the interior of the vertical wall and the footing with thermally communicating heat conducting members, at least some of the heat conducting members extending outwardly from the footing into the ground a selected distance to facilitate heat transfer between the ground and the vertical wall.

* * * * *